(12) United States Patent
Arora et al.

(10) Patent No.: US 11,722,213 B2
(45) Date of Patent: *Aug. 8, 2023

(54) MACHINE LEARNING MODELS FOR ADJUSTING COMMUNICATION PARAMETERS

(71) Applicant: Hughes Network Systems, LLC, Germantown, MD (US)

(72) Inventors: Amit Arora, Germantown, MD (US); Archana Gharpuray, Germantown, MD (US); John Kenyon, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/466,719

(22) Filed: Sep. 3, 2021

(65) Prior Publication Data

US 2021/0399794 A1    Dec. 23, 2021

Related U.S. Application Data

(63) Continuation of application No. 15/858,953, filed on Dec. 29, 2017, now Pat. No. 11,146,327.

(51) Int. Cl.
*H04W 4/02* (2018.01)
*H04B 7/185* (2006.01)
(Continued)

(52) U.S. Cl.
CPC ......... *H04B 7/18513* (2013.01); *G06N 20/00* (2019.01); *H04B 7/18584* (2013.01);
(Continued)

(58) Field of Classification Search
CPC ............ H04B 7/18513; H04B 7/18584; G06N 20/00; H04W 4/02; H04W 72/046; H04W 4/00
(Continued)

(56) References Cited

U.S. PATENT DOCUMENTS 6,067,442 A   5/2000  Wiedeman et al.
6,157,621 A  12/2000  Brown et al.
(Continued)

FOREIGN PATENT DOCUMENTS

WO    WO 2014124753    8/2014

OTHER PUBLICATIONS

International Preliminary Report on Patentability in International Appln. No. PCT/US2018/066367, dated Jun. 30, 2020, 7 pages.
(Continued)

*Primary Examiner* — Hirdepal Singh
(74) *Attorney, Agent, or Firm* — Fish & Richardson P.C.

(57) ABSTRACT

Methods, systems, and apparatus, including computer programs encoded on a computer storage medium, for machine learning models for adjusting communication parameters. In some implementations, data for each device in a set of multiple communication devices is obtained. A machine learning model is trained based on the obtained data. The model can be trained to receive an indication of a geographic location and predict a communication setting capable of providing at least a minimum level of efficiency. After training the machine learning model, an indication of a predicted communication setting for a particular communication device is generated. A determination is then made whether to change a current communication setting for the particular communication device based on the predicted communication setting.

20 Claims, 6 Drawing Sheets

(51) Int. Cl.
  *G06N 20/00* (2019.01)
  *H04W 72/044* (2023.01)
  *H04W 4/00* (2018.01)

(52) U.S. Cl.
  CPC .......... *H04W 4/02* (2013.01); *H04W 72/046* (2013.01); *H04W 4/00* (2013.01)

(58) Field of Classification Search
  USPC ........................................................ 370/316
  See application file for complete search history.

(56) References Cited

U.S. PATENT DOCUMENTS

| | | | |
|---|---|---|---|
| 6,175,719 B1 | 1/2001 | Sarraf et al. | |
| 6,233,451 B1 | 5/2001 | Noerpel et al. | |
| 6,321,088 B1 | 11/2001 | Dempo | |
| 6,704,543 B1 | 3/2004 | Sharon et al. | |
| 7,663,542 B1 | 2/2010 | Goodzeit et al. | |
| 7,698,055 B2 | 4/2010 | Horvitz et al. | |
| 8,542,629 B2 | 9/2013 | Miller | |
| 10,225,002 B2 | 3/2019 | Wharton et al. | |
| 2006/0262724 A1 | 11/2006 | Friedman et al. | |
| 2013/0198119 A1 | 8/2013 | Eberhardt, III et al. | |
| 2015/0195149 A1 | 7/2015 | Vasseur et al. | |
| 2015/0381263 A1 | 12/2015 | Lejnell | |
| 2016/0132787 A1 | 5/2016 | Drevo et al. | |
| 2016/0234281 A1 | 8/2016 | Padmanabhan et al. | |
| 2017/0302330 A1* | 10/2017 | Jayasimha | H04L 1/04 |
| 2017/0324470 A1 | 11/2017 | Roos | |
| 2018/0145740 A1* | 5/2018 | Tani | H04L 1/0003 |
| 2019/0188602 A1 | 6/2019 | Kwant et al. | |
| 2019/0190589 A1 | 6/2019 | Montsma et al. | |
| 2019/0222299 A1* | 7/2019 | Treesh | H04B 7/2041 |
| 2022/0180250 A1* | 6/2022 | Jeffery | G06N 20/00 |

OTHER PUBLICATIONS

International Search Report and Written Opinion in International Appln. No. PCT/US2018/066367, dated Mar. 21, 2019, 13 pages.

* cited by examiner

□ Beam A  ◉ Beam B

MACHINE LEARNING MODELS FOR ADJUSTING COMMUNICATION PARAMETERS

CROSS-REFERENCE TO RELATED APPLICATIONS

This is a continuation of U.S. application Ser. No. 15/858,953, filed Dec. 29, 2017, now pending, of which is incorporated by reference in its entirety.

BACKGROUND

Communications systems can use a variety of settings and configurations to provide appropriate exchange of information. The various settings can include a selection from various frequency channels, data coding techniques, and other options. For example, communications satellites are often used to transmit data to terminals, to provide Internet access or other data communication. Satellite communication systems, like other communication systems, have various parameters that can be set to establish an effective communication link. The appropriate parameters may vary from one terminal to another, or may vary over time for a single terminal.

SUMMARY

In some implementations, a communications system can obtain information about a set of devices using a communication system, and use the information to train machine learning models to predict communication parameters for the devices. For example, a computer system can determine a measure of communication efficiency for each of multiple devices served by a communications system. The computer system can also determine current communication parameters for each of the devices. With the current parameters and current efficiency measures, the computer system can train a machine learning model to predict the communication parameters that would produce the most efficient results for different devices. Using the outputs of the machine learning model, the computer system can evaluate the current parameters of the devices and determine parameters that would provide more efficient communication, e.g., higher data rates, lower frequency bandwidth usage, etc.

For satellite communications systems, one of the parameters that can affect satellite terminals is the assigned spot beam. Satellites can provide spot beams that each cover a different geographical area. With a series of partially overlapping spot beams, a satellite system can provide service over a large geographic area. Typically, a terminal is assigned a specific spot beam to use when the terminal is installed. For terminals located near the edge of the coverage of a spot beam, where two or more beams overlap, the best choice of beam may not be clear. For some terminals, the initial beam assignment may be incorrect or non-ideal for their geographical locations, so that the terminals experience a weak signal or are required to use a low-efficiency modulation and coding.

The techniques described herein can use machine learning models to determine which spot beams are best for different terminals. With these techniques, a computer system can identify terminals that can be reassigned to use a different spot beam to improve communication efficiency. The same techniques can also be used to determine other communication parameters that could be used to improve communication, whether in a satellite communication system or another communication system.

For example, a computer system can obtain information about the satellite terminals in a geographic area. This information can indicate a measure of efficiency for each terminal, such as a modulation and coding used for a satellite link. The measure of efficiency can indicate a number of data bits per symbol in some cases. The computer system can use this information to identify the terminals having the highest efficiency, such as a set of terminals that have efficiency at or above an efficiency threshold. The data describing the identified terminals can be used as training examples showing beam assignments considered to be correct. With these examples, the computer system trains a machine learning model to estimate or predict the appropriate beam assignments for different locations. The computer system can then use the trained machine learning model to predict beams for the terminals that have low efficiency, e.g., terminals having an efficiency below the efficiency threshold. The predictions are evaluated based on other factors, such as load on the different beams and distance of a terminal from the center of the predicted beam, to determine whether a terminal's beam assignment should be changed. The computer system can then recommend a beam assignment changes to make in order to improve communication efficiency, and in some cases may initiate the changes.

In one general aspect, the techniques disclosed herein describe methods of using machine learning models to adjust communication parameters. For example, a method performed by one or more computers can include: obtaining, by the one or more computers, data for each terminal in a set of multiple satellite terminals, the data for each terminal indicating (i) a current satellite beam used by the terminal, (ii) an efficiency measure for communication of the terminal using the current satellite beam, and (iii) a geographic location of the terminal; training, by the one or more computers, a machine learning model based on the obtained data to receive an indication of a geographic location and predict a satellite beam capable of providing at least a minimum level of efficiency for communication at the geographic location; after training the machine learning model, generating, using the machine learning model, an indication of a predicted satellite beam for a particular location, the predicted satellite beam being predicted by the trained machine learning model to provide at least the minimum level of efficiency for communication by a terminal at the particular geographic location; and determining, by the one or more computers, whether to change the current satellite beam for a terminal at the particular geographic location based on the predicted satellite beam.

Implementations can include one or more of the following features. For example, in some implementations, the machine learning model is trained to select, from among multiple satellite beams, a satellite beam providing a highest efficiency of communication for the geographic location indicated to the machine learning model.

In some implementations, the efficiency measure for a terminal is based on a modulation or coding used by the terminal.

In some implementations, the efficiency measure for a terminal indicates a number of bits per symbol transferred using the current satellite beam assigned to the terminal.

In some implementations, the machine learning model is trained to predict a satellite beam for a terminal from among multiple beams of a single satellite.

In some implementations, the machine learning model is trained to predict a satellite beam for a terminal from among beams of multiple satellites.

In some implementations, determining whether to change the current satellite beam for a terminal at the particular geographic location includes determining to assign the predicted satellite beam to the terminal at the particular geographic location. The method includes initiating a change of satellite beam for the terminal at the particular geographic location from a current satellite beam to the predicted satellite beam.

In some implementations, training the machine learning model includes: identifying a subset of the multiple satellite terminals that have an efficiency measure that satisfies a threshold; and using the data for the identified subset of satellite terminals as training examples for training the machine learning model. The method includes, after training the machine learning model, using the trained machine learning model to determine a predicted satellite beam for each of the satellite terminals that have efficiency measures that do not satisfy the threshold.

In some implementations, the method includes: selecting, from among the satellite terminals that have efficiency measures that do not satisfy the threshold, a set of candidate terminals for satellite beam change for which the predicted satellite beams for the terminals are different from the current satellite beams for the terminals; evaluating the predicted satellite beams for the terminals based on locations of the candidate terminals; and selecting, from among the candidate terminals, a final subset to be re-assigned to their respective predicted satellite beams.

In some implementations, the method includes: generating map data indicating the locations of the candidate terminals or the terminals in the final subset; and providing the map data for display.

In some implementations, the machine learning model is a first machine learning model. The method further includes training a second machine learning model based on the obtained data for the multiple satellite terminals, wherein the first machine learning model and the second machine learning model operates using a different predictive algorithm. The indication of a predicted satellite beam for a particular location is generated using output of the first machine learning model and the second machine learning model.

In some implementations, the machine learning model includes a neural network, a maximum entropy classifier, a decision tree, an XG boost tree, a random forest classifier, a support vector machine, or a logistic regression model.

In some implementations, the efficiency measure for a terminal is based on a compression ratio for the terminal or an end-to-end traffic response time for the terminal.

In some implementations, training the machine learning model includes training the machine learning model to predict a satellite beam for a terminal based on receiving only an indication of the geographic location of the terminal as input. Generating the indication of the predicted satellite beam for the particular location includes: providing data indicating the particular location as input to the trained machine learning model; and receiving, as output of the trained machine learning model, data indicating the predicted satellite beam for the particular location.

In some implementations, determining whether to change the satellite beam for a terminal at the particular location includes: comparing an identifier for the predicted satellite beam with an identifier for the current satellite beam used by the terminal; determining, based on the comparison, that the predicted satellite beam is different from the current satellite beam used by the terminal; determining that the location of the terminal is within a threshold distance of a center of the predicted satellite beam; and determining to change the satellite beam assigned to the terminal based on determining that the predicted satellite beam is different from the current satellite beam used by the terminal and determining that the location of the terminal is within the threshold distance of the center of the predicted satellite beam.

In some implementations, the method includes training multiple different machine learning models for different sets of satellite beams, wherein the machine learning model for a set of satellite beams is trained based on data describing terminals currently assigned to use one of the satellite beams in the set.

Other embodiments include corresponding systems, apparatus, and software programs, configured to perform the actions of the methods, encoded on computer storage devices. For example, some embodiments include a satellite terminal and/or a satellite gateway configured to perform the actions of the methods. A device or system of devices can be so configured by virtue of software, firmware, hardware, or a combination of them installed so that in operation cause the system to perform the actions. One or more software programs can be so configured by virtue of having instructions that, when executed by data processing apparatus, cause the apparatus to perform the actions.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
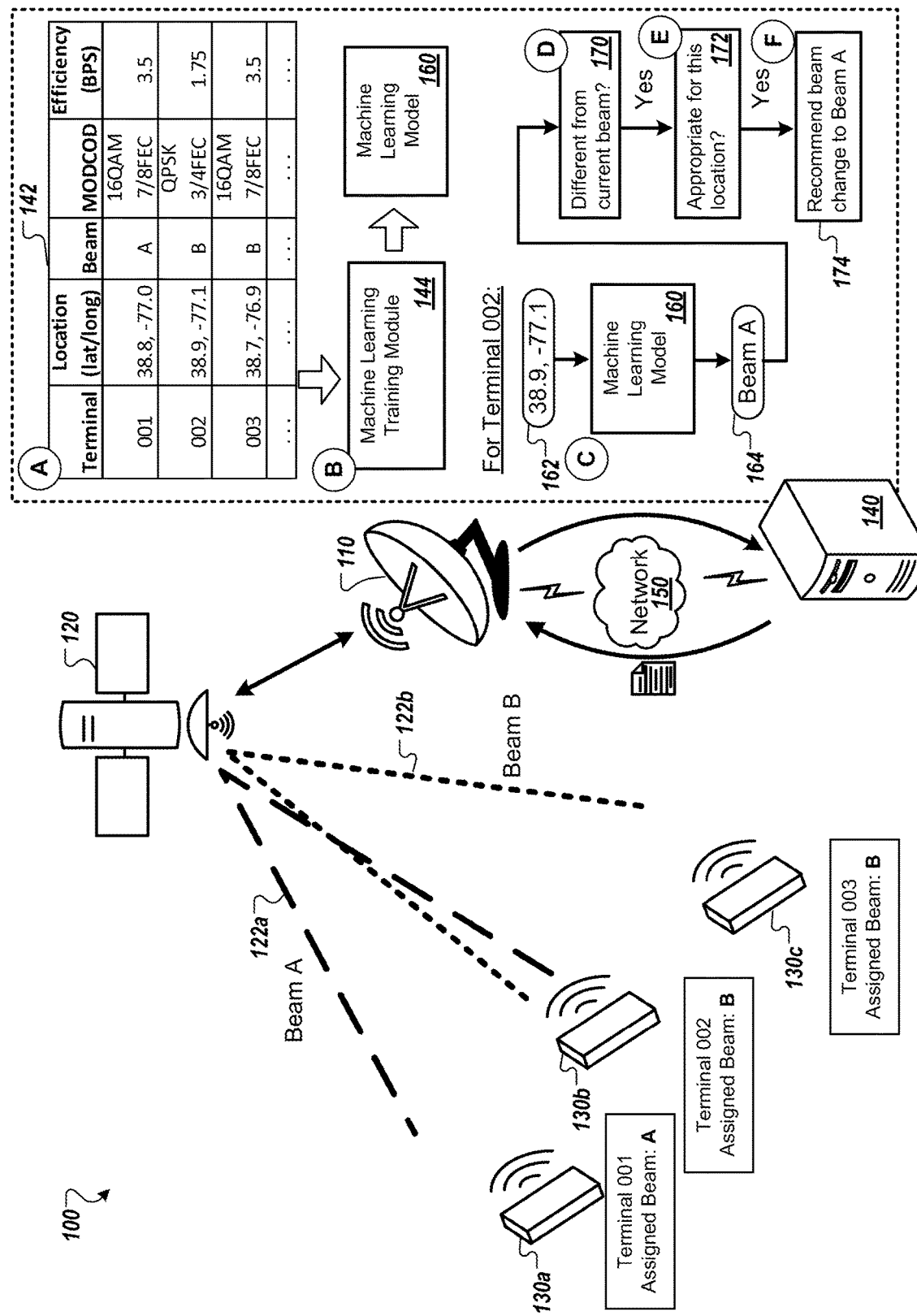
FIG. 1 is a diagram that illustrates an example of a system for using machine learning models to adjust communication parameters.

FIG. 1 is a diagram that illustrates an example of a system 100 that uses machine learning models to adjust communication parameters. The system 100 includes a satellite gateway 110 that communicates with a satellite 120, which in turn communicates with various satellite terminals 130a-130c. The system 100 also includes a computer system 140 that obtains information about the satellite system, for example, by communication with the satellite gateway 110 over a communication network 150. The elements shown can be part of a larger satellite network that includes several satellites, several satellite gateways, and other elements not illustrated.

In the example of FIG. 1, the satellite 120 provides multiple spot beams 112a, 112b, labelled "Beam A" and "Beam B," respectively. Spot-beam satellite networks can use a number of beams that each cover a limited area, in some instances, a diameter no more than a few hundred miles each. To cover a larger area, the beams are arranged to partially overlap at their edges, forming a honeycomb-like arrangement of beams. The beams can have a generally conical shape, so that for an equatorial satellite, the ground area covered by a beam is roughly circular at the equator. As distance from the equator increases, however, the coverage area of a beam becomes less circular and more elliptical. Typically, the strongest signal is available at the center of the beam coverage area. Moving away from the center, the signal detected by a terminal in receive mode decreases, so that the weakest signal for a beam is at the edges of the beam coverage area.

For fixed terminals configured to communicate with a single satellite, installation of the terminal generally involves pointing the antenna, e.g., dish, toward the appropriate satellite. If the terminal is located in a region of overlap of different spot beams, the installer may select from among the multiple overlapping beams. The selection is usually made from among beams from the same satellite, since beams from satellites in different orbital slots would typically require different orientation of the dish. Frequently, the installer will select the beam that has the fewest users as long as the signal strength is adequate. However, the initial beam selection may turn out to be less than ideal, for example, if there is a beam with greater signal strength and fewer users. Similarly, the number of users for each beam may vary over time, and other factors can affect service quality for a beam, including the amount of traffic, the type of traffic, usage patterns, and satellite-level issues.

The example of FIG. 1 illustrates how the computer system 140 can train and use machine learning models to evaluate the beam assignments for the terminals 130a-130c. The computer system 140 can determine, for each terminal 130a-130c, whether the current beam assignment is appropriate, and if not, which beam would provide better service. Various steps of the process are illustrated as stages labelled (A) through (F), which illustrate a flow of data.

In stage (A), the computer system 140 obtains information 142 about the terminals 130a-130c in a satellite system. For example, the computer system 140 can request the information from the satellite gateway 110 or access stored records indicating the identity of each terminal in a geographic area. The information 142 can include various types of data for each terminal, such as a terminal identifier, location data indicating a geographic location of the terminal, a beam identifier for the currently assigned beam, a modulation and coding (MODCOD) currently used, and a measure of efficiency for communication using the currently assigned beam. The location data can be expressed in any appropriate form, such as in latitude/longitude or in GPS coordinates.

The measure of efficiency may indicate how efficiently a terminal is using spectrum resources. For example, the measure of efficiency may be a score or value that is based on the MODCOD or other factors affecting communication. The measure of efficiency could be a different metric, or a compound of several measures. For example, the efficiency measure may represent a weighted or compound measure reflecting response time and spectral efficiency.

In the illustrated table, the efficiency measure indicates a number of data bits per symbol (BPS) that are transferred according to the current link. For example, for terminal 130a given identifier "001," a 16-QAM modulation is used with ⅞ forward error correction (FEC) coding, resulting in an efficiency score of approximately 3.5 BPS. By contrast, the terminal 130b given identifier "002" is using a QPSK modulation is used with ¾ forward error correction (FEC) coding, resulting in a lower efficiency score of approximately 1.75 BPS. Generally, higher BPS scores correspond to higher signal strength, faster data rates, and more efficient use of frequency spectrum. As a result, if a terminal is experiencing a relatively low efficiency with one beam, it is desirable to make a new beam assignment if another beam would provide higher efficiency.

In stage (B), the computer system 140 uses the information 142 describing the terminals 130a-130c to train a machine learning model 160 to predict appropriate beam assignments. The computer system 140 may include a machine learning training module 144 to carry out the training. The module 144 may be implemented in hardware, firmware, software, or some combination thereof.

To train the machine learning model 160, the computer system 140 uses the information 142 about the terminals 130a-130c as training examples. In particular, the computer system 140 identifies terminals having high efficiency, e.g., a BPS of 3 or higher, and uses their information to represent correct beam assignments. In many systems, the set of terminals with high efficiency can include dozens or hundreds of terminals to provide sufficient data points to train the machine learning model 160. Typically, information about at least one hundred terminals having a high efficiency is used.

The machine learning model 160 can be any of various types, such as a neural network, a maximum entropy classifier, a decision tree, an XG boost tree, a random forest classifier, a support vector machine, a logistic regression model, and so on. The training process alters the parameters of the model 160 so that model 160 learns an internal function or mapping between an input geographical location and an appropriate beam identifier that would provide at least the minimum threshold level of efficiency for a terminal located at the geographical location. Training can be an iterative process, where one by one the location for a high-efficiency terminal is entered, the beam indicated by the model 160 is compared to the actual beam assigned to the terminal, and the parameters of the model are updated so the model prediction more closely matches the correct beam assignment. When the model 160 is a neural network model, this can take the form of iterative backpropagation of error.

The machine learning model 160 can be configured to receive location data as input, e.g., a latitude and longitude, or GPS coordinates for a location. In some implementations, the model 160 is trained to predict an appropriate beam in response to a location being provided as the sole input to the model 160. In other implementations, the model 160 can be generated to also use additional parameters as input, such as a count of users of different beams, capabilities of the terminal, a desired efficiency level for the terminal, etc.

The output of the machine learning model 160 can indicate an appropriate beam for a location in one of various forms. For example, the model 160 may output an identifier for the beam predicted for the location. As another example, the model 160 may provide a score for each of multiple beams, where the scores provide relative efficiency likely to be achieved among the different beams. For example, the scores may indicate probabilities or confidence scores indicating how likely each beam is to provide at least a minimum level of efficiency (e.g., at least 3 BPS), or may indicate how likely each beam is to be the highest-efficiency beam for the location.

In stage (C), the computer system 140 uses the trained machine learning model 160 to evaluate the beam assignments for one or more terminals. For example, the computer system 140 can identify the terminals that have low efficiency, e.g., less than 3 BPS, and use the trained model 160 to predict whether there is a beam that would provide a higher efficiency. In FIG. 1, the terminal 130*b*, given identifier "002," is identified as such a terminal. Location data 162 specifying the location of the terminal 130*b* is provided as input to the machine learning model 160, and the model 160 produces a beam prediction output 164.

In stage (D), the computer system 140 compares the predicted beam for a location with the current beam used by a terminal at the location (170). If the model 160 predicts the same beam as the current beam, then the current beam assignment can be accepted as providing the highest efficiency available. On the other hand, if the model 160 predicts a different beam than the one currently assigned, the terminal is a candidate for a beam change to improve efficiency. In the example, the model 160 predicts that Beam A should be used at the location of terminal 130*b*, which is different from the current assignment of Beam B to the terminal. The computer system 140 thus identifies the terminal 130*b* as a candidate for a beam change to use Beam A.

In stage (E), the computer system 140 determines whether the predicted beam is appropriate for the location of the terminal (172). In some implementations, the predictions of the model 160 are tested or verified to avoid potential errors. Although the training process can generally train the model 160 to operate with a high degree of accuracy, the relatively small sample size used for training may limit accuracy for specific areas or in certain circumstances. To verify the accuracy of a prediction, the computer system 140 can compare the location of a terminal with the beam coverage area of a terminal. For example, the computer system 140 can set a maximum distance threshold, which may be based on beam shape, beam power, or other characteristics of the predicted beam. The computer system 140 can then determine a distance between the terminal's location and the center of the predicted beam for that the terminal's location. If the distance is less than the maximum distance threshold, the prediction can be accepted as appropriate. On the other hand, if the distance exceeds the maximum distance threshold, the prediction may be con Other techniques of validating beam predictions can also be used. For example, the computer system 140 can identify high-efficiency terminals near a terminal whose assignment is under evaluation, and determine whether the predicted terminal is the same as those other terminals. Generally, the computer system 140 can determine whether a localized cluster of terminals has the same beam assignment. If so, a terminal within this cluster would also be expected to use the same beam. If the prediction is not consistent with other beam assignments known to be correct, the prediction can be adjusted or discarded. As another example, the confidence scores or probabilities for various beam options for a terminal can be weighted according to the distance of the terminal from the beam center.

In stage (F), having verified that the predicted beam is appropriate for the location of the terminal 130*b*, the computer system 140 recommends that the beam for terminal 130*b* be changed from Beam B to Beam A. The computer system 140 may provide this recommendation for display at the computer system 140 or another device. Similarly, the computer system 140 may send data indicating the recommended change to the satellite gateway 110 or another part of the satellite communication system. In some implementations, the computer system 140 sends an instruction for the beam to be changed, and so actually initiates the beam change for the terminal 130*b* from Beam B to Beam A. For example, the satellite gateway 110 can communicate with the terminal 130*b* over the satellite link to specify new communication parameters, and a time to put the new parameters into effect, in order to transition from communicating using Beam B to Beam A. When transitioning between beams of a single satellite 120, the change can be a software setting change that can be initiated remotely and made by the terminal 130*b* without any on-site adjustment.

In the example of FIG. 1, Beam A and Beam B are both provided by the same satellite 120. The techniques discussed can be used to predict beam assignments from among the beams of a single satellite or the beams of multiple satellites. When switching between beams of the same satellite, typically no movement of the terminal's antenna is needed. When carrying out a switch between beams of different satellites, however, a physical re-orientation of the terminal's antenna is often needed, e.g., to point to the newly used satellite to achieve the best possible efficiency.

As used herein, a beam or beam identifier refers to a specific beam of a specific satellite. As a result, this method works even if the overlapping beams belong to different satellites, which would be the case if a terminal is located in a geographical region being serviced by overlapping beams belonging to different satellites. Beam numbers within the context of a satellite system are generally unique, but in case they are not, an additional identifier would be added to the beam number to make them unique. For example, assume that beam number 10 exists both in satellite A and satellite B and happens to cover the same geographical area. In this case, before the machine learning methods are applied the beam numbers, the data being fed to the machine learning models will be changed to include a satellite id. Beam number 10 for satellite A might be changed to A_10 and beam number 10 for satellite B might be changed to B_10 to ensure that the beams has distinct identifiers. The machine learning algorithm has no dependency on the form of the beam number, since any identifiers can be treated as "labels" for classification and internally converted to unique ordinal values by the machine learning algorithms.

Figure 2:
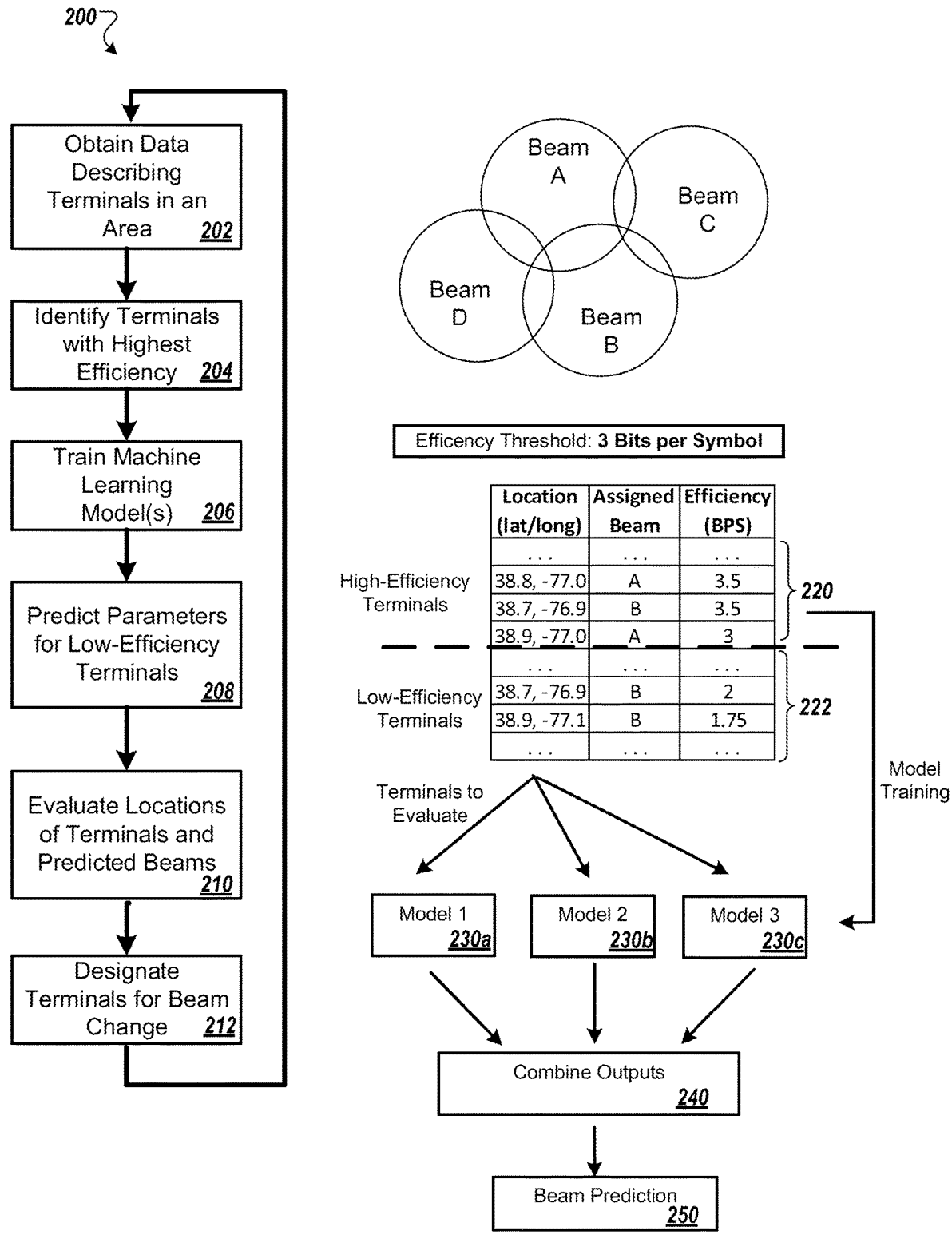
FIG. 2 is a diagram that illustrates another example of using machine learning models to adjust communication parameters.

FIG. 2 is a diagram that illustrates another example of using machine learning models to adjust communication parameters. FIG. 2 illustrates a process 200 that can be performed by the computer system 140 to train and use machine learning models. This represents additional details and variations relative to the technique described with respect to FIG. 1.

In step 202, the computer system 140 obtains data describing terminals in a geographic area. The data obtained for each terminal can include a location of the terminal, a beam assignment for the terminal, and an efficiency measure for using the assigned beam.

The set of terminals for which data is obtained can vary depending on the scope of the models to be generated. For example, information could be obtained for a specific area, such as a particular country. As another example, the terminals could be those that use any of a certain set of adjacent beams. For example, data could be obtained for all terminals assigned to either Beam A or Beam B, to generate a machine learning model specifically for identifying and correcting assignments in the region of overlap between those two beams. A similar pairwise model could be generated for other overlap regions, such as a model for Beams A and C, another model for Beams A and D, etc. Other groups of terminals could also be used, for example, the set of terminals currently assigned to any of Beams A, B, and C, or the set of terminals currently assigned to any of Beams A, B, C, or D, and so on. The set of terminals may be the set of all terminals using any beam from a particular satellite, or the set of terminals using any beam from any of two or more satellites providing adjacent coverage regions For fixed terminals, the location of each terminal may be determined and stored at the time the terminal is installed. The computer system 140 may access those records to determine the locations of terminals. Satellite gateways or other systems may provide information indicating the assignment beam for each of the terminals, as well as an efficiency measure. As noted above, the efficiency measure may be based on the MODCOD used by a terminal, and may be expressed in BPS or in another metric. Other measures of efficiency may indicate compression ratios, end-to-end traffic response times, signal to noise (SNR) or signal to noise and interference (SINR), and other communication conditions.

In step 204, the computer system 140 identifies terminals having the highest efficiency. For example, the computer system 140 groups the terminals into different groups according to their efficiency measures. In the example, an efficiency threshold of 3 BPS is set as a minimum for a high-efficiency terminal. One group 220 of terminals has at least that efficiency, while another group 222 does not. Depending on the implementation, other ways of partitioning the data and selecting a subset as examples of correct examples can be used.

In step 206, the computer system 140 trains one or more machine learning models. The computer system 140 can train multiple models 230a-230c using the data about the terminals in the high-efficiency group 220. Each model may use a different classification algorithm or model structure. For example, one model 230a may be a neural network, another model 230b may be a maximum-entropy classifier, and another model 230c may be a regression model. As another example, the models 230a-230c may be of the same type, e.g., all neural network models, but may be trained using different training algorithms or data sets. Examples of types of models that can be used include neural networks, maximum entropy classifiers, decision trees, XG boost trees, random forest classifiers, support vector machines, logistic regression models, and so on.

In step 208, the computer system 140 predicts parameters for the terminals in the low-efficiency group 222. This can be done by providing the location of each terminal in the low-efficiency group 222 to the models 230a-230c one at a time. For each location input, the models 230a-230c each generate output predicting the how appropriate the beams in a set would be for the location. The output of each model 230a-230c could be in a binary form (e.g., 0 for Beam A, 1 for Beam B), or the form of probability scores indicating how likely each beam is to provide the highest efficiency (e.g., a 20% probability that Beam A is best for the location, and an 80% probability that Beam B is best for the location), or in the form of probability scores indicating how likely each beam would provide acceptable efficiency (e.g., 40% probability that Beam A provides 3 BPS or greater, and 90% probability that Beam B provides 3 BPS or greater).

The outputs of multiple models 230a-230c can be combined to improve accuracy (240). For example, a weighted score can be generated for each potential beam, based on the outputs of each of the models 230a-230c. As another example, a voting mechanism may be used in which a prediction of a beam is accepted only if a majority of the models 230a-230c agree that the same beam would be best. In some instances, the voting may be required to be unanimous to prompt a change in beam. After combining the outputs from the models 230a-230c for a location, a beam prediction 250 is generated indicating a specific beam considered to be most appropriate for the location.

A predicted beam can be determined for each of the terminals in the low-efficiency group 222. With these predictions, the computer system identifies a set of candidate terminals for beam change as the set of terminals in the low-efficiency group 222 that have current beam assignments different from the predicted beam assignment.

In step 210, the computer system 140 evaluates the locations of candidate terminals and the predicted beams for those terminals. For a given terminal, the scores representing combined outputs of the models 230a-230c can be weighted according to the distance between the terminal and the center of the beams. Although the models 230a-230c may score one beam as most likely to provide efficient communication, a larger distance from the beam center may suggest that the beam is not as likely to be correct. In some cases, the application of weightings based on location may alter the prediction output by the models 230a-230c, and indicate that a different beam is best for the location.

As another example, thresholds can be set to limit or block assignments to beams that are too far from the location of a terminal. To avoid making incorrect changes in beam assignment, the computer system 140 can compare terminal locations with the center locations of the predicted beams. If a terminal is significantly closer to a different beam than the one predicted, e.g., by more than a threshold distance, the computer system 140 may change which beam the terminal should be changed to or may remove the terminal from the set of candidates for beam change.

In some implementations, the terminals recommended for a beam change are then plotted on a map, along with the beam centers, to confirm that the recommendations are appropriate. A user of the system may view the map on an interface provided by the computer system 140, and the user may confirm or reject individual recommendations after looking at the map.

In step 212, the computer system 140 designates a set of terminals for beam changes. For example, from among the initial candidate set of terminals, the computer system 140 may select a subset that have satisfied the location verification criteria applied in step 210. This subset can represent the final list of terminals that are recommended to have their beam changed.

Once a set of recommendations is available for satellite terminals that should be moved to a different beam, the computer system 140 can check whether the number of terminals to be moved exceeds a pre-defined threshold. If the number does not exceed a pre-defined threshold, then the entire list of terminals is provided as candidates for being moved to a different beam. If however, the number does exceed a pre-defined limit then this invention takes a smaller sized subset, e.g., obtained by random sampling, and provides that as a final list of terminals being recommended for a beam change. The exact value of the pre-defined limit and the size of the random subset to be recommended in case the pre-defined limit is exceeded can be determined by field trials. This functionality may limit disruptions due to large changes of users from one beam to another. Similarly, these limits may act as a failsafe in case of incorrect beam changes, and generally will not be triggered because of the accuracy of the original beam selection algorithm as well as the machine learning techniques discussed above.

In some implementations, the computer system 140 may identify, from the terminals in the final subset, which terminals are recommended for switching between beams of the same satellite, and which are recommended for switching between beams of different satellites. For changes between beams of the same satellite, the computer system 140 or satellite infrastructure can send instructions to the terminals and satellite infrastructure to change the beam assignment. For changes between beams of different satellites, the information can be sent to be used to dispatch an installer to correct the orientation of the terminal to carry out the beam change.

After making the recommendations of beam changes, the computer system 140 can repeat the process 200, for example, for a different geographic area having a different set of terminals and beams. The process 200 can be used to evaluate the assignments of beams for different regions of overlap across an entire satellite system. As another example, the process 200 may be repeated periodically for the same geographic area to determine whether conditions have changed in a manner that any other terminals should have their beam assignments changed.

Figure 3:
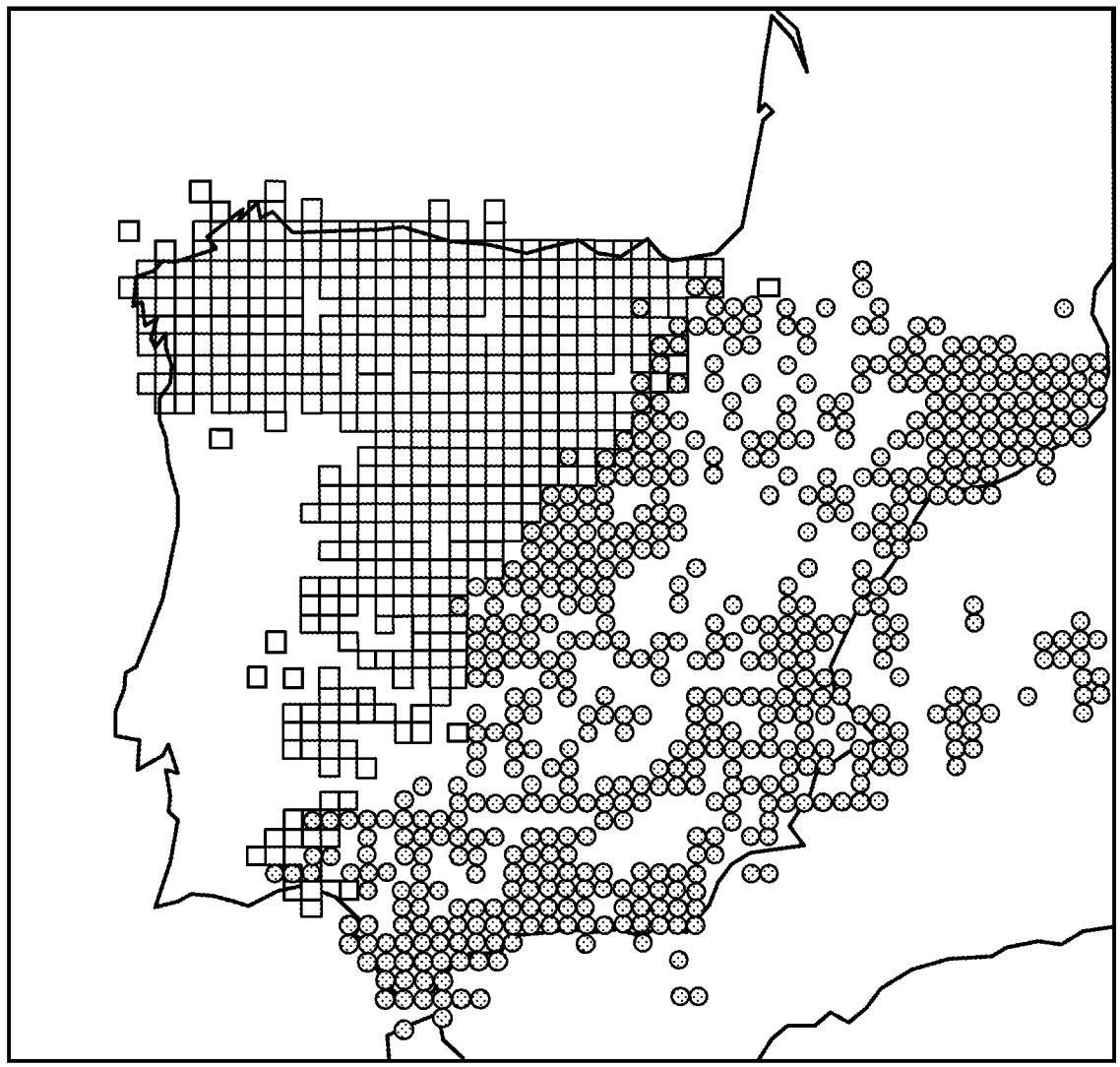
FIGS. 3-5 are maps indicating examples of locations of terminals and beam assignments.
Figure 4:
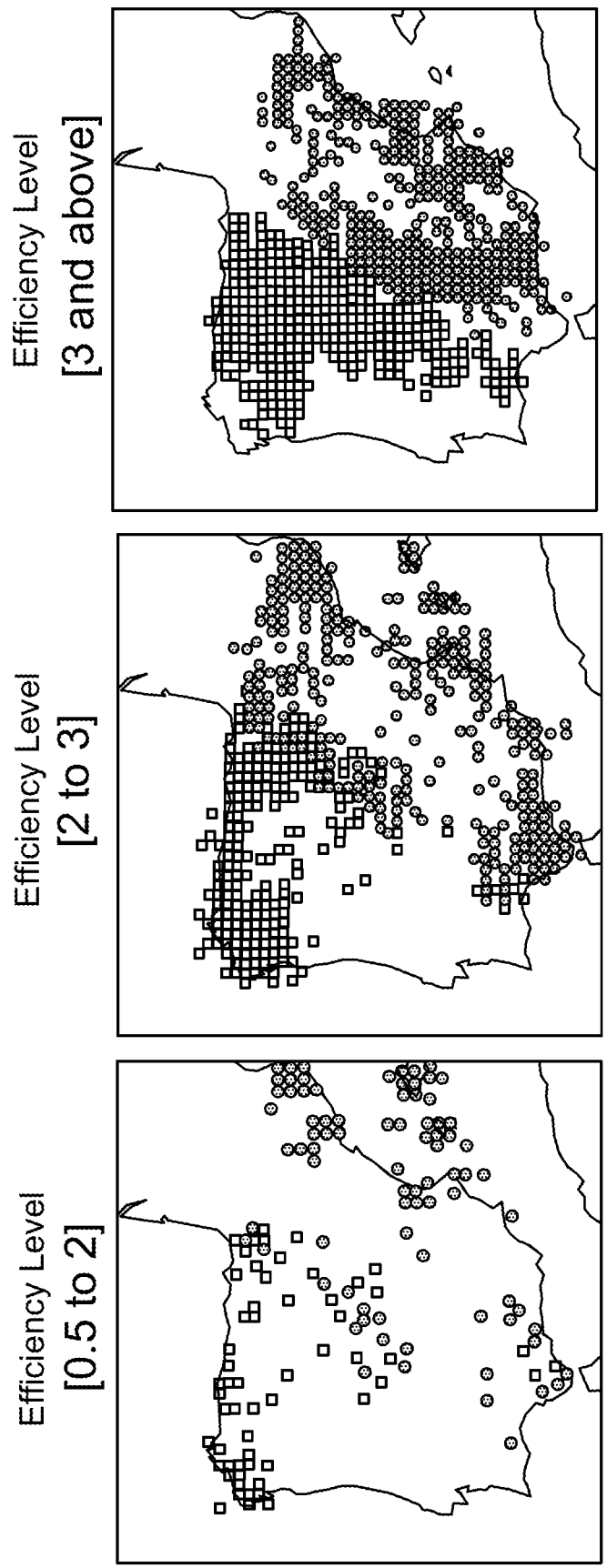
Figure 5:
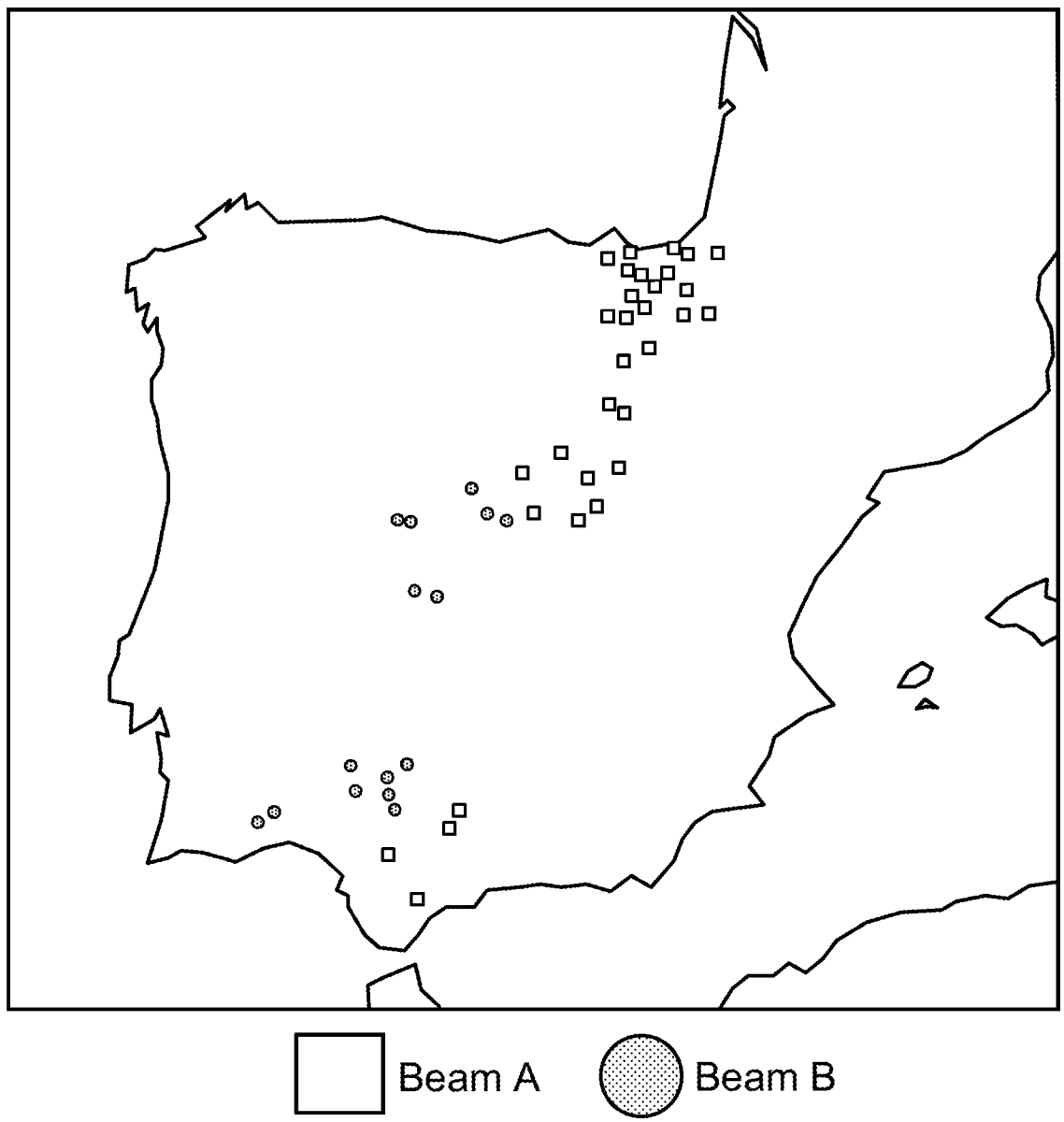

FIGS. 3-5 are maps indicating examples of locations of terminals and beam assignments. The figures show the terminals in a satellite network in Spain and how the proposed invention can suggest corrections for some low spectral efficiency terminals.

FIG. 3 shows a binned plot for terminals in this network spread over two beams, e.g., beam A and beam B. Beams A and B are overlapping right in the center of the country, clearly creating regions of beam overlap.

FIGS. 4A-4C show the spectral efficiency distribution for the terminals in this network. Beam A has many terminals in the overlap areas with low spectral efficiency but beam B terminals in the same region have high spectral efficiency.

FIG. 5 shows the results from the machine learning algorithm, which shows terminals which are identified as needing a change in beam. The machine learning model identified several terminals currently using beam A which would be better served by beam B. Several of these are actually very close to the beam center for beam B, which confirms that these terminals should actually have been assigned to use beam B and not beam A. Several terminals currently using beam B are also identified as terminals that would be better served by beam A. A computer system, such as the computer system 140, can provide map data for views of any or all of the maps shown in FIGS. 3-5. For example, after identifying the terminals for a beam change shown in FIG. 5, the map of FIG. 5 can be displayed and a user can approve or reject the changes (as a group or individually per terminal) before the computer system 140 initiates beam changes for the terminals.

Figure 6:
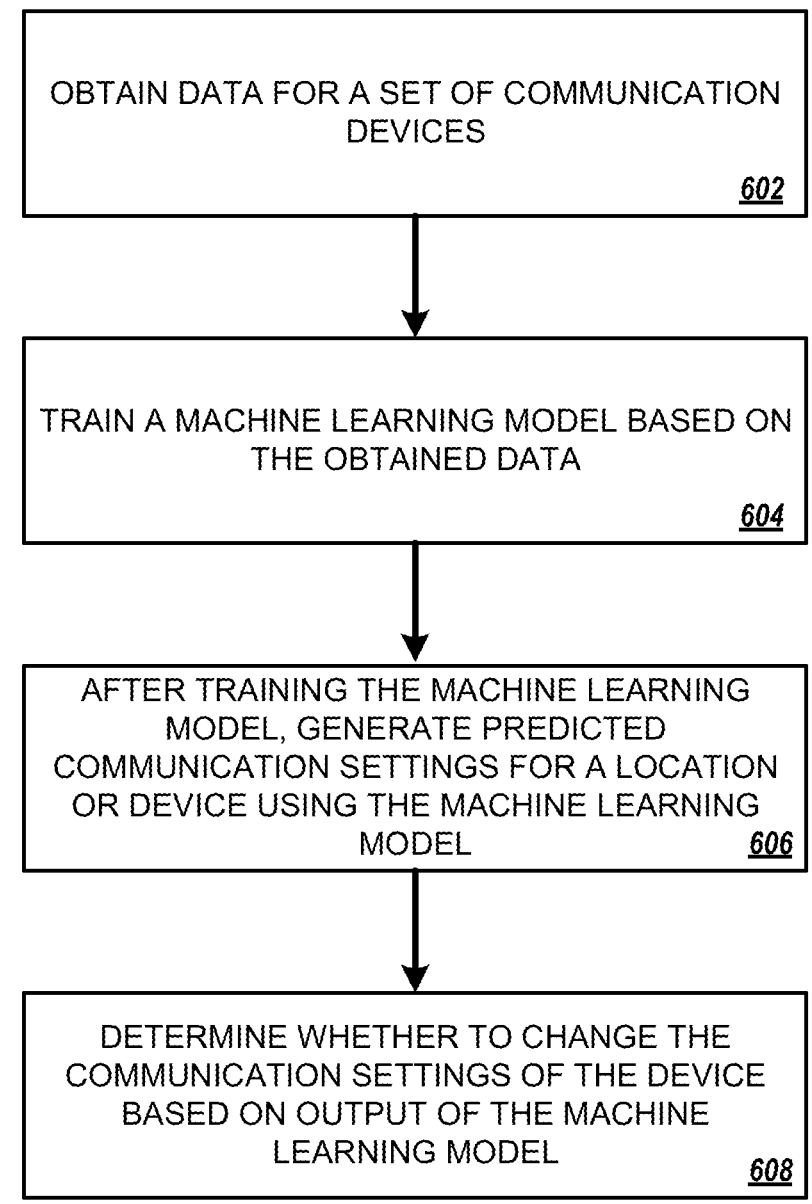
FIG. 6 is a flow diagram that illustrates a process for using machine learning models to adjust communication parameters.

FIG. 6 is a flow diagram that illustrates a process 600 for using machine learning models to adjust communication parameters. The process 600 can be performed by one or more computers, which may be part of a communication infrastructure or separate from it.

The one or more computers obtain data for a set of communication devices (602). This data can describe various properties of a communication link of the various communication devices, such as status information or settings for a wireless communication interface for each of the devices. The data may indicate current information for active communication links of the devices. The data may describe characteristics of any appropriate layer of the open systems interconnection (OSI) model, e.g., settings for a physical layer, a data link layer, a network layer, a transport layer, a session layer, a presentation layer, or an application layer. Accordingly, the machine learning techniques discussed herein can be used to train a model to predict settings for any of these layers. The data may be obtained from the devices, e.g., by the one or more computers identifying the devices, sending a request for the information to each of the devices, and receiving the data in response. In addition, or as an alternative, data describing properties of communication links of the devices may be obtained from other sources, such as device installation or activation records, user account records, communication network infrastructure (e.g., gateways, servers, switches, routers, etc.).

In some implementations, the communication devices are satellite terminals. The data can describe aspects of the status or configuration of the terminals and their communication links in a satellite communication network. For example, for each terminal in the set, (i) a current satellite beam used by the terminal, (ii) an efficiency measure for communication of the terminal using the current satellite beam, and (iii) a geographic location of the terminal. The efficiency measure for a terminal can be based on a modulation and/or coding used for communication with the terminal. In some cases, the efficiency measure for a terminal indicates a number of bits per symbol transferred using the current satellite beam assigned to the terminal. In some cases, the efficiency measure for a terminal is based on a compression ratio for the terminal or an end-to-end traffic response time for the terminal.

The one or more computers train a machine learning model based on the obtained data (604). The machine learning model can be trained to predict communications settings for individual devices. For example, the model can be trained so that, in response to receiving input data describing characteristics or circumstances of a particular device, the model provides a set of communication settings for the particular device. The training can adjust the model based on the settings of devices that achieve high efficiency or high performance, so that input data corresponding to a device prompts the model to provide settings that achieve high efficiency or high performance for similar devices in similar circumstances. The model can provide settings that provide at least a minimum level of communication channel efficiency, or which are expected to result in a certain combination of performance characteristics (e.g., efficiency, throughput, latency, SINR, etc.).

The machine learning model can include, for example, a neural network, a maximum entropy classifier, a decision tree, an XG boost tree, a random forest classifier, a support vector machine, or a logistic regression model. In some implementations, multiple different machine learning models are trained and used together to determine predicted communication settings. For example, first and second machine learning models may be trained based on the obtained data for the multiple communication devices, wherein the first and second machine learning models operate using a different predictive algorithms. Predicted communication settings can be generated using the outputs of both the first and second machine learning models, e.g., by weighting the outputs or by a voting mechanism.

Training the machine learning model can include identifying a subset of the communication devices that have an efficiency measure or other performance characteristic that satisfies a threshold. The data sets for the identified subset of communication devices are used as training examples for training the machine learning model. After training, the machine learning model can be used to determine predicted settings for each of the communication devices that have efficiency measures or performance characteristics that do not satisfy the threshold.

As an example, a machine learning model can be trained to receive an indication of a geographic location and predict a satellite beam capable of providing at least a minimum level of efficiency for communication at the geographic location. The machine learning model can be trained to select, from among multiple satellite beams, a satellite beam providing a highest efficiency of communication for the geographic location indicated to the machine learning model. The machine learning model may be trained to predict a satellite beam for a terminal from among multiple beams of a single satellite. The machine learning model may be trained to predict a satellite beam for a terminal from among beams of multiple satellites.

After training the machine learning model, the one or more computers generate, using the machine learning model, predicted communication settings for a location or device (606). This can involve providing data indicating a location of the device to the model as input. Other data may be provided, e.g., data describing hardware characteristics of the device, bandwidth demands of the device, current loading of portions of the communication system, etc.

In some implementations, the machine learning model is provided data indicating a location of a satellite terminal. The machine learning model produces an indication of a predicted satellite beam for the location. The predicted satellite beam can be one predicted by the trained machine learning model to provide at least a minimum level of efficiency for communication by a terminal at the particular geographic location.

The one or more computers determine whether to change the communication settings of a device based on the output of the machine learning model (608). This can be done by comparing the predicted settings with the current settings for the device to determine if the two sets of settings are different. If so, the one or more computers can validate the predicted settings to determine whether the predicted settings are compatible with the device. For example, the one or more computers can verify whether the predicted settings can be achieved with the capabilities or configuration of the device, whether predicted settings would satisfy the bandwidth demand of the device, and so on. When a determination is made to change the setting of a device, the one or more computers may recommend the change to a user and/or a system administrator. In some cases, the one or more computers remotely initiate the change in settings for the device.

As an example, for a satellite terminal, the one or more computers can determine whether to change the current satellite beam for a terminal at the particular geographic location based on the predicted satellite beam. The one or more computers can select, from among the satellite terminals that have efficiency measures that do not satisfy the threshold, a set of candidate terminals for satellite beam change for which the predicted satellite beams for the terminals are different from the current satellite beams for the terminals. The one or more computers can evaluate the predicted satellite beams for the terminals based on locations of the candidate terminals, and select, from among the candidate terminals, a final subset to be re-assigned to their respective predicted satellite beams.

In some cases, the one or more computers determine to assign the predicted satellite beam to the terminal at the particular geographic location. The one or more computers may initiate a change of satellite beam for the terminal at the particular geographic location from a current satellite beam to the predicted satellite beam.

In some implementations, the process 600 is used to train different machine learning models for different geographical regions or different portions of a communication system. For example, different models can be trained for different sets of satellite beams. The machine learning model for a set of satellite beams is trained based on data describing terminals currently assigned to use one of the satellite beams in the set.

In some implementations, the one or more computers generate map data indicating the locations of devices that are recommended to have their communication settings changed. The map data can be providing for display, e.g., on a display screen.

In some implementations, training the machine learning model comprises training the machine learning model to predict a satellite beam for a terminal based on receiving only an indication of the geographic location of the terminal as input. To generate the indication of a predicted satellite beam, the one or more computers can providing data indicating the particular location as input to the trained machine learning model, and receive, as output of the trained machine learning model, data indicating the predicted satellite beam for the particular location. In other implementations, other information, such data indicating current beam loading (e.g., a percentage of beam capacity used for various beams) can also be provided as input to the machine learning model. The model can be trained to use this information to appropriately distribute assignments among terminals, e.g., to avoid recommending assignments that would overburden one beam while leaving excessive capacity unused on another beam.

In some implementations, the one or more computers can determine whether to change a satellite beam by: comparing an identifier for the predicted satellite beam with an identifier for the current satellite beam used by the terminal; determining, based on the comparison, that the predicted satellite beam is different from the current satellite beam used by the terminal; determining that the location of the terminal is within a threshold distance of a center of the predicted satellite beam; and determining to change the satellite beam assigned to the terminal based on determining that the predicted satellite beam is different from the current satellite beam used by the terminal and determining that the location of the terminal is within the threshold distance of the center of the predicted satellite beam.

While various examples herein discuss satellite communications systems, the techniques can similarly be applied to other communications systems, such as cellular systems, self-organizing networks, Wi-Fi networks, and so on. For example, rather than train a model to predict satellite beam assignments, models can be trained and used to predict other communication settings, such as a cell assignment for a device (e.g., a phone), a wireless communication channel for a device, a data rate or modulation and encoding for a device, etc.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented, in part, as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatuses, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments of the invention have been described. Other embodiments are within the scope of the following claims. For example, the actions recited in the claims may be performed in a different order and still achieve desirable results.

What is claimed is:

1. A method performed by one or more computers, the method comprising:
    obtaining, by the one or more computers, data for each communication device in a set of multiple communication devices, the data for each communication device indicating (i) a communication setting used by the communication device, (ii) an efficiency measure for communication by the communication device using the communication setting, and (iii) a geographic location of the communication device;
    training, by the one or more computers, a machine learning model based on the obtained data to receive an indication of a geographic location and predict a communication setting capable of providing at least a minimum level of efficiency for communication at the geographic location;
    after training the machine learning model, generating, using the machine learning model, an indication of a predicted communication setting for a particular communication device, the predicted communication setting being predicted by the trained machine learning model to provide at least the minimum level of efficiency for communication at a particular geographic location where the particular communication device is located; and
    determining, by the one or more computers, whether to change a current communication setting for the particular communication device based on the predicted communication setting.

2. The method of claim 1, wherein the machine learning model is trained to indicate, from among multiple communication settings, a communication setting predicted to provide a highest efficiency of communication based on input to the machine learning model that includes an indication of the particular geographic location.

3. The method of claim 1, wherein, in the obtained data for the multiple communication devices, the efficiency measure is determined based on a modulation or coding used by the communication device.

4. The method of claim 1, wherein, in the obtained data for the multiple communication devices, the efficiency measure is determined based on a compression ratio for the communication device or an end-to-end traffic response time for the communication device.

5. The method of claim 1, wherein the efficiency measure for a communication device indicates a number of bits per symbol transferred using the communication setting assigned to the communication device.

6. The method of claim 1, wherein the machine learning model is trained to predict a satellite beam for a communication device to use, such that the predicted communication setting is a predicted satellite beam.

7. The method of claim 1, wherein the machine learning model is trained to predict a cell assignment for a communication device to use, such that the predicted communication setting is a predicted cell assignment.

8. The method of claim 1, wherein the machine learning model is trained to predict a data rate for a communication device to use, such that the predicted communication setting is a predicted data rate.

9. The method of claim 1, wherein the machine learning model is trained to predict a wireless communication channel for a communication device to use, such that the predicted communication setting is a predicted wireless communication channel.

10. The method of claim 1, wherein the machine learning model is trained to predict a modulation for a communication device to use, such that the predicted communication setting is a predicted modulation.

11. The method of claim 1, wherein the machine learning model is trained to predict an encoding for a communication device to use, such that the predicted communication setting is a predicted encoding.

12. The method of claim 1, wherein determining whether to change the current communication setting comprises determining to assign the predicted communication setting to the particular communication device; and
    wherein the method includes initiating a change of the communication setting for the communication device from a current communication setting of the particular communication device to the predicted communication setting.

13. The method of claim 1, wherein training the machine learning model comprises:
    identifying a subset of the multiple communication devices that have an efficiency measure that satisfies a threshold; and
    using the data for the identified subset of the multiple communication devices as training examples for training the machine learning model;
    wherein the method comprises, after training the machine learning model, using the trained machine learning model to determine a predicted communication setting for each of the communication devices that have efficiency measures that do not satisfy the threshold.

14. The method of claim 1, wherein the machine learning model is a first machine learning model;
    wherein the method further comprises training a second machine learning model based on the obtained data for the multiple communication devices, wherein the first machine learning model and the second machine learning model operates using a different predictive algorithm; and
    wherein the indication of a predicted communication setting for the particular geographic location is generated using output of the first machine learning model and the second machine learning model.

15. The method of claim 1, wherein the machine learning model comprises a neural network, a maximum entropy classifier, a decision tree, an XG boost tree, a random forest classifier, a support vector machine, or a logistic regression model.

16. The method of claim 1, wherein training the machine learning model comprises training the machine learning model to predict a communication setting for a communication device based on receiving only an indication of the geographic location of the communication device as input;
    wherein generating the indication of the predicted communication setting for the particular geographic location comprises:
        providing data indicating the particular geographic location as input to the trained machine learning model; and
        receiving, as output of the trained machine learning model, data indicating the predicted communication setting for the particular geographic location.

17. The method of claim 1, further comprising training multiple different machine learning models for different sets of communication settings, wherein the machine learning model for a set of communication settings is trained based on data describing communication devices currently assigned to use one of the communication settings in the set.

18. A system comprising:
    one or more computers; and
    one or more computer-readable media storing instructions that, when executed by the one or more computers, cause the one or more computers to perform operations comprising:
        obtaining, by the one or more computers, data for each communication device in a set of multiple communication devices, the data for each communication device indicating (i) a communication setting used by the communication device, (ii) an efficiency measure for communication by the communication device using the communication setting, and (iii) a geographic location of the communication device;
        training, by the one or more computers, a machine learning model based on the obtained data to receive an indication of a geographic location and predict a communication setting capable of providing at least a minimum level of efficiency for communication at the geographic location;
        after training the machine learning model, generating, using the machine learning model, an indication of a predicted communication setting for a particular communication device, the predicted communication setting being predicted by the trained machine learning model to provide at least the minimum level of efficiency for communication at a particular geographic location where the particular communication device is located; and
        determining, by the one or more computers, whether to change a current communication setting for the particular communication device based on the predicted communication setting.

19. The system of claim 18, wherein the machine learning model is trained to select, from among multiple communication settings, a communication setting providing a highest efficiency of communication for the geographic location indicated to the machine learning model.

20. One or more non-transitory computer-readable media storing instructions that, when executed by one or more computers, cause the one or more computers to perform operations comprising:
    obtaining, by the one or more computers, data for each communication device in a set of multiple communication devices, the data for each communication device indicating (i) a communication setting used by the communication device, (ii) an efficiency measure for communication by the communication device using the communication setting, and (iii) a geographic location of the communication device;
    training, by the one or more computers, a machine learning model based on the obtained data to receive an indication of a geographic location and predict a communication setting capable of providing at least a minimum level of efficiency for communication at the geographic location;
    after training the machine learning model, generating, using the machine learning model, an indication of a predicted communication setting for a particular communication device, the predicted communication setting being predicted by the trained machine learning model to provide at least the minimum level of efficiency for communication at a particular geographic location where the particular communication device is located; and determining, by the one or more computers, whether to change a current communication setting for the particular communication device based on the predicted communication setting.

\* \* \* \* \*